United States Patent

Kawasaki et al.

[11] Patent Number: 5,182,591
[45] Date of Patent: Jan. 26, 1993

[54] CAMERA SYSTEM

[75] Inventors: Masahiro Kawasaki; Hiroyuki Takahashi; Shigeru Iwamoto, all of Tokyo, Japan

[73] Assignee: Asahi Kogaku Kogyo Kabushiki Kaisha, Tokyo, Japan

[21] Appl. No.: 692,678

[22] Filed: Apr. 29, 1991

[30] Foreign Application Priority Data

Apr. 27, 1990 [JP] Japan .................. 2-113700

[51] Int. Cl.$^5$ ............................... G03B 3/00
[52] U.S. Cl. ................................... 354/195.1
[58] Field of Search ................. 354/400-409, 354/195.1-201, 286

[56] References Cited

U.S. PATENT DOCUMENTS

| | | | |
|---|---|---|---|
| 4,477,164 | 10/1984 | Nakai et al. | 354/286 |
| 4,509,842 | 4/1985 | Taniguchi et al. | 354/402 |
| 4,560,267 | 12/1985 | Nakai et al. | 354/412 |
| 4,602,861 | 7/1986 | Taniguchi et al. | 354/403 |
| 4,673,275 | 6/1987 | Nakai et al. | 354/412 |
| 4,841,322 | 6/1989 | Kawasaki et al. | 354/400 |
| 4,912,494 | 3/1990 | Tanaka et al. | 354/402 |
| 4,945,376 | 7/1990 | Kawasaki et al. | 354/400 |
| 5,038,163 | 8/1991 | Hirasawa | 354/400 |
| 5,060,005 | 10/1991 | Itoh et al. | 354/286 X |

*Primary Examiner*—Michael L. Gellner
*Assistant Examiner*—Jae N. Noh
*Attorney, Agent, or Firm*—Sandler, Greenblum & Bernstein

[57] ABSTRACT

A camera system for communicating data including focal length data between a micro computer in a camera body and a zoom lens mounted to the camera body, wherein the zoom lens includes a position detecting device which detects divided focal length steps corresponding to optional focal lengths of the zoom lens, a specific focal length outputting device which outputs at least one focal length of the focal length step detected by the position detecting device, and an arithmetic operating device which calculates a focal length for each focal length step in accordance with the data of the position detecting device and the specific focal length outputting device.

19 Claims, 6 Drawing Sheets

CAMERA SYSTEM

BACKGROUND OF THE INVENTION

1. Field of the Invention

The present invention relates to a camera system having a data communicator function between a camera body and a photographing lens.

2. Description of Related Art

In a recent single lens reflex camera having an automatic focusing device, information peculiar to a photographing lens, such as open F-number data used in an automatic exposure function or an automatic focusing function is sent as electrical signals from the photographing lens to a CPU (central processing unit) of a camera body.

Information peculiar to the photographing lens is stored in a lens ROM provided in the photographing lens. The photographing lens and the camera body are provided with electrical contacts on a lens mount and a body mount to transmit and receive signal information between the photographing lens and the camera body, respectively. The body CPU transmits and receives signal information to and from the lens ROM through the electrical contacts and reads the data stored in the lens ROM. A clock pulse is output from the camera body to send address signals from the body CPU synchronously therewith, so that predetermined data can be output from the lens ROM in accordance with the address signals.

Furthermore, in a single lens reflex camera having a photographing lens with an AF motor (automatic focusing motor) and a PZ motor (power zoom motor), etc., if control of the motors is effected by the body CPU, there will be an over load on the body CPU. In particular, in a single lens reflex camera in which various kinds of photographing lenses are exchangeably mounted to one camera body, the body CPU must read different parameters depending on the photographing lenses from the associated lens ROM's and perform predetermined arithmetic operations in accordance with the read parameters to control the photographing lenses. This makes quick operations impossible or next to impossible.

In addition to the foregoing, various data, is stored in the ROM of the photographing lens. In particular, in a zoom lens in which a zoom code plate, which comes into sliding contact with brushes provided on a zoom ring when a latter is rotated, has focal length values corresponding to the divided codes of the zoom code plate, the respective focal length values are stored separately in the ROM of the photographing lens. Accordingly, the ROM has to have a large capacity memory. It is necessary to erase the stored necessary data or to troublesomely replace the ROM with a larger capacity ROM in order to write new data therein.

SUMMARY OF THE INVENTION

The primary object of the present invention is to provide a camera system in which the load of operations of a camera body side is reduced, and in which focal length data is not stored in the ROM and can be used in accordance with need.

The basic concept of the present invention resides in that the focal length data is not stored in the ROM and is calculated in accordance with its need.

To achieve the object mentioned above, according to the present invention, there is provided a camera system for data communication between a micro computer provided in a camera body and a zoom lens mounted to the camera body, wherein the zoom lens transmits at least focal length data to the micro computer of the camera body, wherein the zoom lens comprises a position detecting means for detecting divided focal length steps corresponding to optional focal lengths of the zoom lens, a specific focal length outputting means for outputting at least one specific focal length of the focal length step detected by the position detecting means, and an arithmetic operation means for calculating the focal length for each focal length step in accordance with data of the position detecting means and the specific focal length outputting means.

In this arrangement, the load of operations on the micro computer of the camera body can be reduced, with the arithmetic operation means calculating the focal length data only when it is needed. Accordingly, it is not necessary to continuously store the focal length data in the ROM. Thus, the effective memory (storage capacity) of the ROM can be increased. The focal length data can be easily and accurately calculated when necessary.

The present disclosure relates to subject matter contained in Japanese patent application No. HEI 2-113700 (filed on Apr. 27, 1990) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 1:
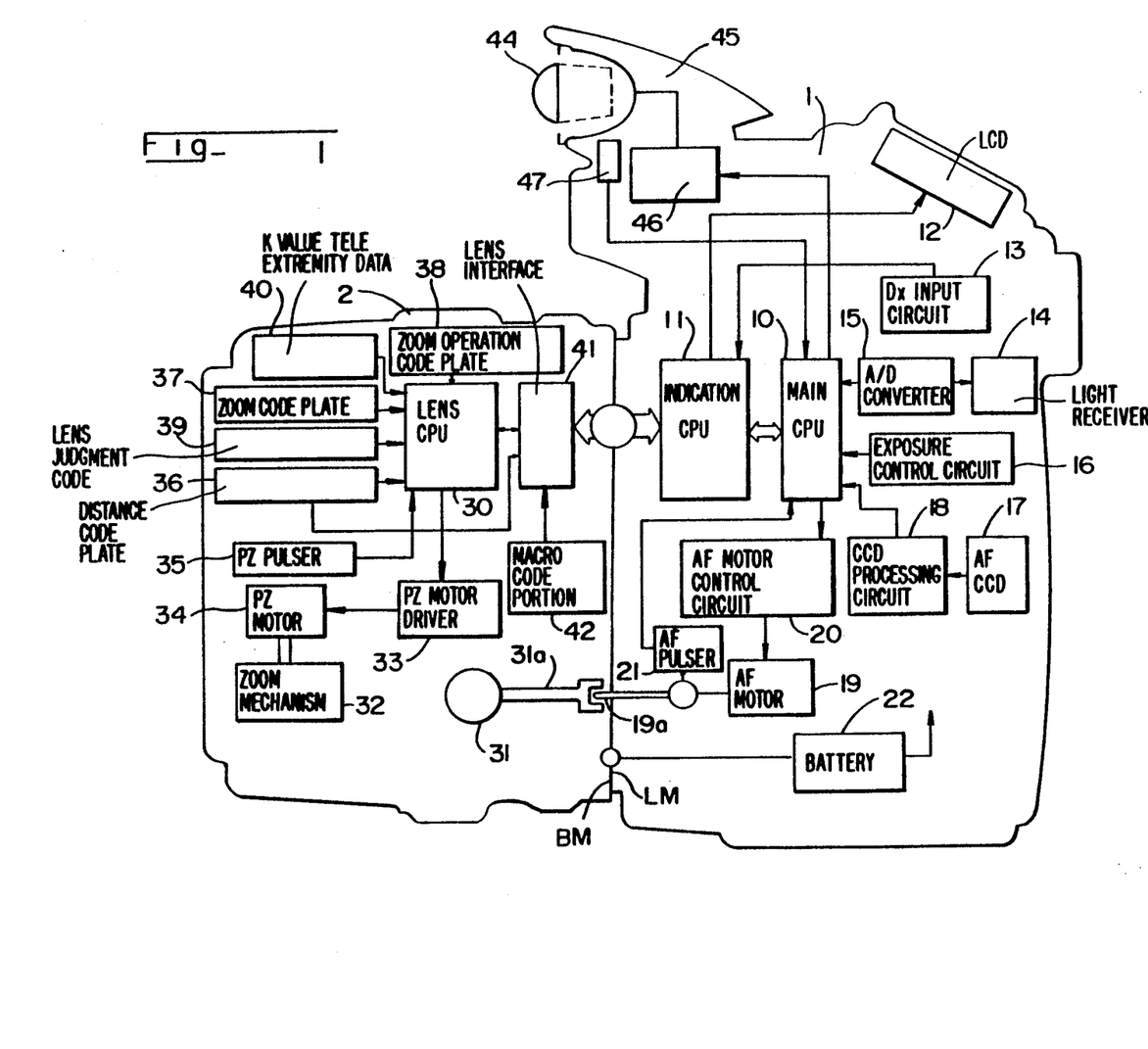
FIG. 1 is a block diagram of a single lens reflex camera having a camera according to the present invention.

FIG. 1 shows a single lens reflex camera having a camera system according to an aspect of the present invention.

Camera body 1 has a main CPU 10 and an indication CPU 11 (which is collectively referred to as a micro computer). The main CPU 10 generally control the whole camera system and performs arithmetic operations of various data necessary for taking a picture. The indication CPU 11 functions not only as an interface (data communication) to input data by switch members and to transmit and receive data (signals) to and from a photographing lens (zoom lens) 2, but also as to a controller to control the indication of the photographing data.

The indication CPU 11 is connected to an LCD panel 12 which indicates the photographing data and a DX code input circuit 13 which selectively reads at least ISO sensitivity data of a film from DX codes provided on a surface of a patrone of the film.

A light receiver 14, which receives light incident thereon through the photographing lens 2 to output analog signals in accordance with the amount of light received, is connected to the main CPU 10 through an A/D converter 15.

The main CPU 10 is also connected to an exposure control circuit 16 which drives and controls a shutter mechanism (not shown) and a diaphragm mechanism (not shown), etc., in accordance with the input photographing data, a CCD processing circuit 18 which detects the focusing of the photographing lens 2 in response to the data (focal point data) of an object to be taken, output from an automatic focusing CCD object distance measuring sensor 17, an AF motor control circuit 20 which drives an AF motor 19 for carrying out the focusing of the photographing lens 2, and an AF pulser 21 which detects the angular displacement of the AF motor 19 to generate pulses corresponding to the angular displacement. The object distance measuring sensor 17 receives light of the object to be taken. The light is made incident through the photographing lens 2 to output a predetermined focus data signal.

The AF motor 19 transmits the drive power to the photographing lens 2 through a coupler 19a provided on a body mount BM of the camera body, so as to be extended from the camera body and a coupler 31a provided on a lens mount LM of the photographing lens 2 when the connection between the couplers 19a and 31a is established.

A battery 22 powers not only electronic components and electronic circuits in the camera body 1, but also electronic components and electronic circuits in the photographing lens 2.

In the photographing lens 2 are provided a focusing mechanism 31 which rotates a focus adjusting cam ring (not shown) to move focusing lens groups in an optical axis direction so as to effect a focusing operation, and a zooming mechanism 32 which rotates a zoom ring (not shown) to relatively move at least two groups of variable power lenses in the optical axis direction, so as to effect a zooming operation.

The focusing mechanism 31 is connected to the coupler 31a, which is electrically connected to the coupler 19a when the photographing lens 2 is attached to the camera body 1, to transmit the rotational drive of the AF motor 19 to the focusing mechanism 31. The focusing mechanism 31 rotates the focus adjusting cam ring to affect the focusing. The couplers 19a and 31a are disconnected by a disengaging means (not shown), so that a photographer can manually rotate a focus adjusting operation ring to adjust the focus in a manual focusing mode.

The zooming mechanism 32 is driven by a PZ (power zoom) motor 34, which is in turn driven and controlled by a power zoom motor driving portion 33. The operation of the PZ motor driving portion 33 is controlled in the power zoom mode by the lens CPU 30 or a power zoom switch SWPZ2 (shown in FIG. 2), and is driven in the manual zoom mode by a manual operation of a photographer. The mode selection between the power zoom mode and the manual zoom mode is controlled by a zoom switch SWZ1 (shown in FIG. 2). The control is effected by a switching means.

To the input ports of the lens CPU 30 are connected a PZ pulser 35 which detects the displacement of the PZ motor 34, a distance code plate 36 which reads the position data of the focus adjusting cam ring (focusing lens groups) driven by the focusing mechanism 31 (i.e., it detects the divided focal length steps at a specific focal length), a zoom code plate 37 which reads position data (i.e., focal length data) of the zooming cam ring (variable power lens groups) driven by the zooming mechanism 32, a zoom operation code plate 38 which inputs data with regard to a direction and speed of the power zooming by the operation of the zoom operation switch, a lens judgement code plate 39 which judges the kind of photographing lens (i.e., zoom lens, single focus lens, or single focus macro lens, etc.) and the data stored in the ROM, and a data setting portion 40 which is made of a code plate and which outputs data on a K value at a telephoto extremity and data on a single focus macro mode at an infinite object distance. In the illustrated embodiment, "K value" (automatic focusing drive pulse coefficient) means a value used for the automatic focusing operation of the lens which can be moved by the AF motor and is the number of pulses of the AF pulser 21 necessary for moving an image plane formed by the photographing lens 2 through a unit displacement (e.g., 1 mm).

The zoom code plate 37 and the other code plates, per se known, are usually made of code plates secured to a cam ring and brushes mounted to a stationary ring with a plurality of electrical contacts which are independently brought into sliding contact with the codes of the code plates. The positions of the cam rings are usually detected as bit information by a combination of the codes with which the electrical contacts of the brushes come into contact. The focal length is divided into a plurality of equidistant focal length steps.

A lens interface 41 is connected to a data input terminal of the lens CPU 30. The data communication between the lens CPU 30 and the indication CPU 11 is affected through the lens interface 41, to which a macro code member 42 is connected to input macro data thereto in a macro mode.

The lens CPU 30 performs arithmetic operations to obtain various data, such as a present focal length, a present object distance, etc. The data necessary for the arithmetic operation is stored in an internal ROM (not shown) of the lens CPU 30.

Circuit of Camera Body

Figure 3:
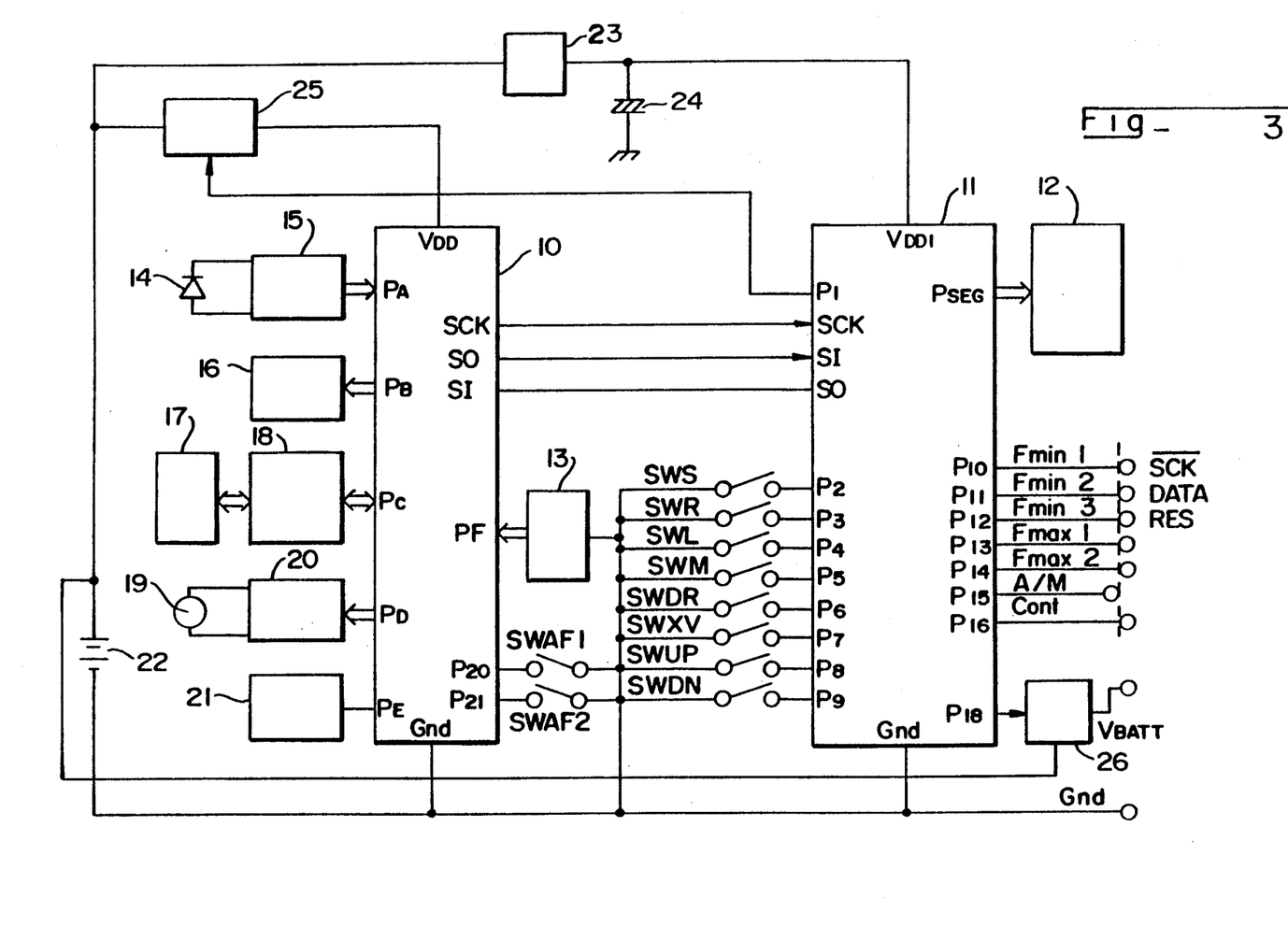
FIG. 3 is a block diagram of the main circuit arrangement of the camera body shown in FIG. 1.

The circuit arrangement of the camera body 1 will be described below in detail with reference to FIG. 3.

The voltage of the battery 22, which is controlled by a regulator 23 and which is backed up by a super capacitor 24 is supplied to terminal VDD1 of the indication CPU 11. The indication CPU 11 is always activated at a constant voltage input to the terminal VDD1.

Terminal P1 of the indication CPU 11 is connected to a DC/DC converter 25, which turns the power source of the main CPU 10 ON and OFF. In addition photometer switch SWS is selectively connected to the DC/DC converter 25 to be turned ON when a shutter button (not shown) is pressed by a half step. Furthermore, terminals P3 and P4 of the indication CPU 11 are connected to a release switch SWR which is turned ON when the shutter button is fully pressed and a lock switch SWL which is turned ON when the camera is brought into a suitable photographing position, respectively.

The DC/DC converter 25 is actuated when the lock switch SWL is turned ON and when the photometer switch SWS or the release switch SWR is turned ON, and in accordance with a command from the indication CPU 11 upon inputting the lens data from the photographing lens 2, to supply terminal VDD of the main CPU 10 with a reference constant voltage to thereby actuate the main CPU 10.

Furthermore, terminals P5, P6, P7, P8 and P9 of the indication CPU 11 are connected to a mode switch SWM, a drive switch SWDR, and exposure correction switch SWXV, an up-switch SWUP and a down-switch SWDN, respectively.

The indication CPU 11 operates in accordance with the operative and inoperative states of the switches SWM, SWDR, SWXV, SWUP, and SWDN. For instance, the exposure modes, which includes a programed exposure mode, an automatic exposure mode, and a manual exposure mode, are selected in accordance with the operation of the mode switch SWM. Similarly, drive modes, which includes a single shot mode and a continuous shot mode, are selected in accordance with the operation of the drive switch SWDR. The selection modes can be varied in accordance with the operation of the up-switch SWUP and down-switch SWDN at the position in which the exposure modes or the drive modes can be selected.

The indication CPU 11 makes it possible to change the exposure value when the exposure switch SWXV is turned ON. Namely, the exposure value can be increased and decreased in accordance with an operation of the up-switch SWUP and the down-switch SWDN, respectively.

The indication CPU 11 has a group of indication control terminals PSEG that are connected to an indicating LCD 12 through a bus line. The indicating LCD 12 indicates necessary photographing data in accordance with commands of the indication CPU 11 when the lock switch SWL is turned ON.

Seven terminals P10 through P16 of the indication CPU 11 are connected to electrical contacts Fmin1, Fmin2, Fmin3, Fmax1, Fmax2, A/M, and Cont provided on the body mount BM of the camera body, respectively. Terminal P18 of the indication CPU 11 is connected to a switch circuit 26.

The electrical contacts Fmin1, Fmin2 and Fmin3 function as communication terminals for data communication between the photographing lens 2 and the indication CPU 11. Namely, the electrical contacts Fmin1, Fmin2 and Fmin3 constitute a serial clock signal inputting and outputting terminal $\overline{SCK}$, a data transmitting and receiving terminal DATA, and a reset signal outputting terminal RES, respectively.

Terminals P10, P11 and P12 of the indication CPU 11 are always pulled up within the indication CPU 11.

The output of the switch circuit 26 is connected to a terminal VBATT and functions as a switch for establishing and breaking an electrical connection between the battery 22 and the terminal VBATT in accordance with the level of the terminal P18. Terminal Gnd of the indication CPU 11 is connected to ground terminal Gnd of the battery 22.

The indication CPU 11 and the main CPU 10 communicate with each other through serial terminals SCK, serial-in terminals SI and serial-out terminals SO. In conventional data communication, data is transferred using command codes, as shown in Table 1 below. In Table 1, the left column represents data which is output from the indication CPU 11 to the main CPU 10, and the right column represents data which is transferred from the main CPU 10 to the indication CPU 11. This data is set based on the measurements of the object luminance and the object distance, etc. controlled by the main CPU 10.

TABLE 1

| Indication CPU 11 → Main CPU | Main CPU 10 → Indication CPU |
|---|---|
| Mode Setting Data | Indication Tv, Sv data |
| Drive Setting Data | Film Sensitivity Data |
| Exposure Correction Setting Data | AF Accomodation Pulse No. Data |
| Lens CPU Data | AF Return Completion Data |
| Setting TV, SV Data | |
| AF Accommodation Data | |
| AF Return Code | |
| AF Return Pulse No. Data | |
| AF Accommodation and Return Codes | |

Contact groups PA, PB, PC, PD, PE and PF of the main CPU 10 are connected to an A/D converter 15, the exposure control circuit 16, the CCD processing circuit 18, the AF motor control circuit 20, the AF pulser 21, and the DX code input circuit 13, respectively.

Terminal P20 of the main CPU 10 is connected to a first AF switch SWAF1, which selects an auto focus mode in which focusing is automatically affected by the AF motor 19 and a manual focus mode in which focusing is manually affected by a photographer. Terminal P21 of the main CPU is connected to a second AF switch SWAF2, which switches the mode of the shutter release between a focus priority mode and a release priority mode. The first and second AF switches SWAF1 and SWAF2 are mechanically associated with each other, so that, for example, when the manual focus mode is selected by the first AF switch SWAF1, and second AF switch SWAF2 is switched to the release priority mode. Namely, when the first AF switch SWAF1 is turned ON, the second AF switch SWAF2 is turned OFF.

Circuit of Photographing Lens

Figure 2:
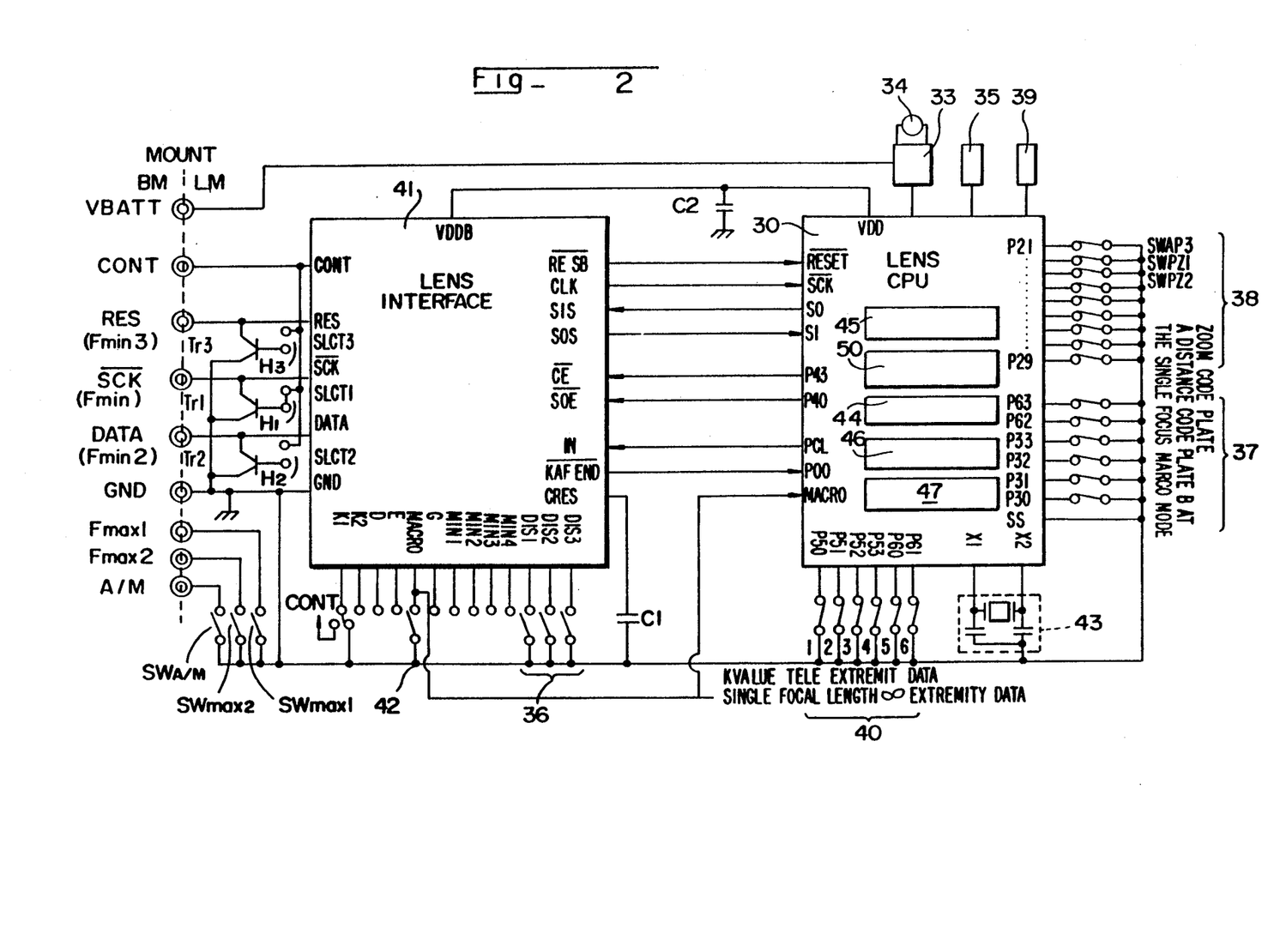
FIG. 2 is a block diagram of a main circuit arrangement of a photographing lens shown in FIG. 1.

The circuit arrangement of the electrical system provided in the photographing lens 2 will be explained below, with reference to FIG. 2.

The lens mount LM of the photographing lens 2 is provided with electrical contacts VBATT, CONT, RES (Fmin3), $\overline{SCK}$ (Fmin1), DATA (Fmin2), GND, Fmax1, Fmax2 and A/M corresponding to associated electrical contacts provided on the body mount BM when the photographing lens 2 is attached to camera body 1. Although the arrangement of the electrical contacts of the lens mount LM is not identical to that of the body mount BM, for the purpose of clarification, the electrical contacts of the lens mount designated are electrically connected to the corresponding electrical contacts of the body mount with the same reference numerals.

Contact VBATT on the lens side is connected to the PZ driver 33, so that the power of the battery 22 is directly supplied to the PZ motor 34 through the contact VBATT by the switching operation of the PZ driver 33.

Contact Fmax1 and Fmax2 on the lens side function also as a steady information transmitting means for transmitting the maximum F-number data of two bits to the camera body, similar to those provided on a conventional AE lens. Namely, the contacts Fmax1 and Fmax2 on the lens side are grounded through the switches SWmax1 and SWmax2, so that maximum F-number (minimum diaphragm value) data is formed in accordance with a combination of the levels of the switches SWmax1 and SWmax2 depending on the ON/OFF states thereof. The combinations of the levels of the contacts Fmax1 and Fmax2 on the lens side and the maximum F-number are shown in Table 2 below.

TABLE 2

| F NO. | Fmax2 | Fmax1 |
|---|---|---|
| 22 | 0 | 0 |
| 32 | 0 | 1 |
| 45 | 1 | 0 |

The contact A/M on the lens side functions to send the auto/manual information of the diaphragm to the camera body 1 and is grounded through a selection switch SWA/M. The selection switch SWA/M is in association with the rotation of a diaphragm ring (not shown) of the photographing lens 2, so that when the diaphragm ring is in the auto position and the manual position, the selection switch is turned ON and OFF, respectively.

Contacts Fmin1, Fmin2, and Fmin3 on the lens side function not only as a steady information transmitting means for transmitting the open (minimum) F-number information of three bits to the camera body 1, similarly to those provided on an existing (old) AE lens, but also as data communication contacts between the camera body and the photographing lens. The relation between the levels of the contacts Fmin1, Fmin2 and Fmin3 on the lens side and the minimum F-number is shown by example in Table 3 below.

TABLE 3

| F NO. | Fmin3 | Fmin2 | Fmin1 |
|---|---|---|---|
| 1.4 | 0 | 0 | 0 |
| 1.7 | 0 | 0 | 1 |
| 2 | 0 | 1 | 0 |
| 2.5 | 0 | 1 | 1 |
| 2.8 | 1 | 0 | 0 |
| 3.5 | 1 | 0 | 1 |
| 4 | 1 | 1 | 0 |
| 4.5 | 1 | 1 | 1 |

To provide both the steady information transmitting function and the data communication function on the contacts Fmin1, Fmin2 and Fmin3 on the lens side, the contacts are connected to PNP transistors Tr1, Tr2 and Tr3, respectively. The PNP transistors Tr (Tr1, Tr2 and Tr3) are connected at the emitters thereof to the lens contacts Fmin1, Fmin2 and Fmin3, and at the bases thereof to the contact CONT through fuze portions H1, H2 and H3 so as to establish and break the connection, respectively. The collectors of the transistors are grounded. It is possible to provide the fuse portions H1, H2 and H3 between the emitters and the lens contacts Fmin (Fmin1, Fmin2 and Fmin3).

The indication CPU 11 causes the voltage of the contact CONT to drop to ground in order to obtain the open F-number data from the lens contacts Fmin1, Fmin2 and Fmin3. As a result, any transistor Tr to which the fuse portion is connected is turned ON, so that the emitter of the affected transistor which has been turned ON becomes a high level "H", and the emitter of the transistor which has not been turned ON becomes a ground level. Namely, the transistors Tr are selectively made ON or OFF in accordance with the connection of the fuse portions H1, H2 and H3 to change the level of the emitters thereof. Consequently, the three-bit open F-number data is output to the lens contacts Fmin1, Fmin2, and Fmin3.

Terminals CONT, RES, $\overline{SCK}$, DATA and GND of the lens interface 41 is connected to the terminals CONT, Fmin3, Fmin1, Fmin2 and GND on the lens side, respectively.

The lens contact CONT is connected to the bases of the transistors Tr and to the terminal CONT of the lens interface 41, as mentioned above. The switching of the power supply from the terminal CONT of the lens interface is affected through the lens terminal Fmin3. After the data on the open F-number is transferred, when the terminals CONT and RES (lens terminal Fmin3) become levels "H" and "L", respectively, the power is supplied to the lens CPU 30.

Terminal VDDB of the lens interface 41 is connected to terminal VDD of the lens CPU through a capacitor C2, so that a constant voltage supplied from terminal CONT of the camera body 1 is supplied to the lens CPU 30.

Terminals DIS1, DIS2 and DIS3 of the lens interface 41 are connected to distance code plate 36, so that distance data signals of the object distance corresponding to the position of the focusing cam ring driven by the focusing mechanism 31 are input to the terminals DIS1, DIS2 and DIS 3.

Terminal MACRO of the lens interface 41 is connected to macro code portion 42, which functions as a macro switch, which is turned ON when the zoom operation ring is actuated to switch the photographing lens 2 to the macro mode.

The input and output terminals of the lens interface 41 are connected to corresponding input and output terminals of the lens CPU 30. Reset terminal $\overline{RESB}$, clock terminal CLK, serial-in terminal SIS, serial-out terminal SOS, terminal $\overline{CE}$, terminal $\overline{SOE}$, terminal $\phi$ IN, and terminal $\overline{KAFEND}$, of the lens interface 41 are connected to reset terminal $\overline{RESET}$, serial clock terminal $\overline{SCK}$, serial-out terminal SO, serial-in terminal SI, terminal P43, terminal P40, terminal PCL and terminal POO of the lens CPU 30, respectively. Terminal CRES of the lens interface 41 is grounded through a delay capacitor C1.

The lens CPU 30 controls the PZ driver 33 connected to the control terminal thereof. The lens CPU 30 is also connected to the PZ pulser 35 and the lens discriminating code 39, which outputs data with regard to the lens type (i.e., old lens, new lens, etc.).

Terminals P30, P31, P32 and P33 and terminals P62 and P63, of the lens CPU 30 are connected to codes of the zoom code plate 37 (position detecting means). The zoom code plate 37 functions as a distance code plate B at the single focus macro mode.

Terminals P21 through P29 are connected to various switches, including the automatic focusing switch SWAF and the power zoom switches SWPZ1 and SWPZ2, etc. Terminals P50 through P53, P60 and P61 of the lens CPU 30 are connected to the data setting portion 40.

The lens CPU 30 includes a lens judging means 45, a data storing means 46, a data table 47, a telephoto extremity focal length storing means 50, and an arithmetic operating means 44.

The lens judging means 45 determines whether lens or a single focus micro lens etc., in accordance with the data an old lens or a new lens, and a zoom lens, a single focus of the lens discriminating code 39. An old lens does not have a lens CPU. On the other hand, a new lens contains a lens CPU therein. A new lens is illustrated in FIGS. 1 and 2.

The data storing means 46 stores a common ratio and a common difference for geometrically and arithmetically dividing the focal length range of the photographing lens 2.

Coefficient data $(r^x)^2$ necessary for calculating a K VALUE corresponding to the photographing lens is prestored in the data table 47, as shown in Tables 1 and 2.

The telephoto extremity focal length storing means 50 stores the focal length of the photographing lens at the telephoto extremity.

The arithmetic operating means 44 calculates the focal lengths and the drive pulse coefficient K VALUE's at respective focal length steps upon zooming, in accordance with the determination of the lens by the lens judging means 45, the levels of the terminals P30 through P33, P62 and P63, the K VALUE of the data setting portion 40 at the telephoto extremity, and the K VALUE at the single focus macro mode, and stores the calculated data in a RAM.

The photographing lens 2 has a clock pulse generating circuit 43 which is connected to clock terminals X1 and X2 of the lens CPU 30. The lens CPU 30 operates synchronously with the clock pulses generated by the clock pulse generating circuit 43.

As mentioned above, on the camera body side, after terminal CONT drops to level "L" and the open F-number is read, both terminals CONT and RES (Fmin3) become level "H" to reset the lens CPU 30.

When the reset is released, the lens CPU 30 begins the old communication in accordance with the clock pulses of the camera body 1. This communication is carried out by hardware of the lens interface 41. In the illustrated embodiment, data for 19 bytes is sent to the camera body 1.

Upon completion of the communication, terminal KAFEND of the lens interface 41 becomes a level "L", which is a communication completion signal. Consequently, the lens CPU waits for renewal data of the communication from the camera body 1.

When the lens CPU 30 receives the renewal communication data from the camera body 1, terminal DATA (Fmin2), which has been at level "H", becomes a level "L" and then becomes level "H" again, so that the camera body can commence the new communication. Note that the states of terminals CONT and RES are held when the lens CPU 30 is first activated.

The new communication which commences upon completion of the old communication is carried out directly between the lens CPU 30, the indication CPU 11 and the main CPU 10 without the lens interface 41. The data is transmitted from the lens CPU 30 to the main CPU 10 and the indication CPU 11, or from the main CPU computer 10 and the indication CPU 11 to the lens CPU 30, in accordance with the command code of the indication CPU 11. An example of the data communication between camera body 1 and photographing lens 2 is shown in Table 4.

The new data communication is affected synchronously with the clock pulse output from the photographing lens 2.

TABLE 4

| Lens → Camera Body | | |
|---|---|---|
| AF Data | 0011.0001 | (31H) |
| AE Data | 0011.0010 | (32H) |
| All Data | 0011.0011 | (33H) |
| Every One Byte | 1010.XXXX | (5XH) |
| Lens Data 1 | 0110.0000 | (60H) |
| Lens Data 2 | 0110.0001 | (61H) |
| Camera Body → Lens | | |
| Focal Length Data fWide | 0110.0010 | (62H) |
| Focal Length Data fTele | 0110.0011 | (63H) |
| Focal Length Data fX(present) | 0110.0100 | (64H) |
| Lens Drive Data | 0110.0110 | (66H) |
| Lens Accommodation | 1001.0010 | (90H) |
| Lens Return | 1001.0001 | (91H) |
| PH ON | 1001.0010 | (92H) |
| PH OFF | 1001.0011 | (93H) |

| | Lens Data 1 60H | Lens Data 2 61H | Lens Drive Data 66H |
|---|---|---|---|
| Bit 7 | PH Demand | Lens CPU | fW extremity |
| Bit 6 | AF A/M | | fT extremity |
| Bit 5 | PZ A/M | Lens Internal PZ | |
| Bit 4 | PZ P/A | | |
| Bit 3 | PZ MODE | | PZ Far |
| Bit 2 | SET SW | | PZ Near |
| Bit 1 | Lens A/M | Lens | |
| Bit 0 | Lens O/C | Version | |

Calculation of Focal Length

The following discussion will be directed to the arithmetic operating means calculation of focal length in both the zooming and macro modes.

First, a zooming ratio R of the photographing lens 2, used to geometrically divide the code of the distance code plate 37 (distance code plate B) into n-codes, is obtained by the following equation:

$$R = f_T/f_W \quad (1)$$

wherein $f_T$ designates a focal length at a telephoto extremity and $f_W$ designates a focal length at a wide angle extremity, respectively.

Then, a common ratio r satisfies the following equation when the code of the zoom code plate 37 of the photographing lens 2 is geometrically divided into n-codes with reference to the telephoto extremity:

$$R = r^{n-1} \quad (2)$$

From equation (2) above, we have;

$$r = \sqrt[n-1]{R} \quad (3)$$

Accordingly, focal length fx at a position x of the zoom ring ($0 \leq x \leq n-1$, where "0" designates the telephoto extremity and "n−1" designates the wide angle extremity) is determined by the following equation:

$$f_x = f_T/r^x \quad (4)$$

Since the zoom code plate 37 (distance code plate B) corresponding to the zoom ring position x has a certain width (band) of code in which there is no change of code, in case of slight angular displacement of the zoom ring, it is necessary to geometrically position the focal length $f_x$ corresponding to the zoom ring position x at an intermediate position of the zoom code plate 37. To this end, changing points of the zoom code plate 37 are obtained as follows:

$$f_{x-x+1} = f_T / r^{x+0.5} \qquad (5)$$

wherein $f_{x-x+1}$ is a focal length at a changing point between a zoom code position x and a zoom code position (x+1) adjacent thereto.

Since the calculation is carried out by the arithmetic operating means 44, the memory of the ROM can be reduced in comparison with the memory of the ROM in which the focal lengths for every divided code by the zoom code plate 37 (distance code plate B) must be stored.

Upon arithmetically dividing the zoom code plate 37 into n-codes, a common difference d can be obtained as follows:

$$f_{dif} = f_T - f_W \qquad (6)$$

$$\therefore d = f_{dif}/(n-1) \qquad (7)$$

$$f_x = f_T - d_x \qquad (8)$$

wherein $f_{dif}$ designates the actual amount of zooming, $f_T$ the focal length at the telephoto extremity.

Therefore, the changing point can be obtained by the following equation:

$$f_{x-x+1} = f_T - d(x+0.5) \qquad (9)$$

Figure 4:
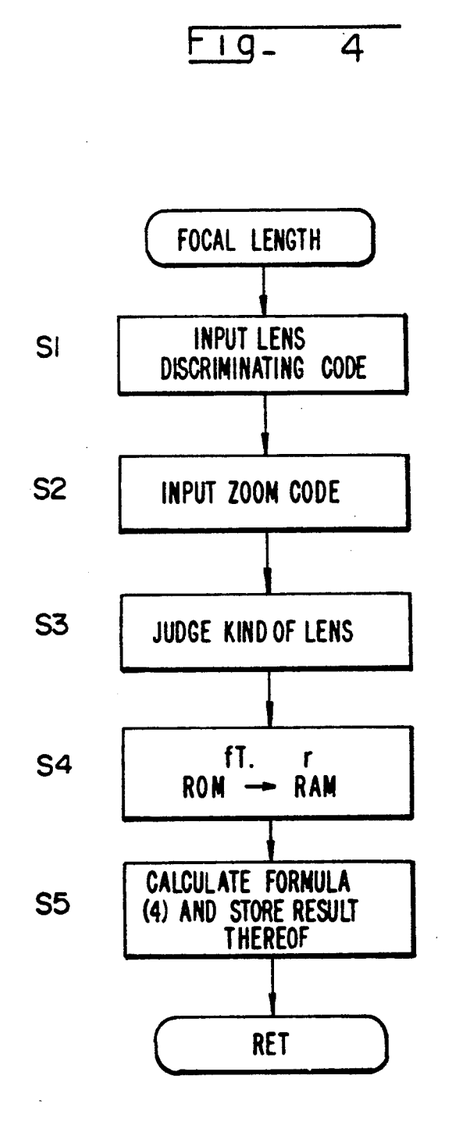
FIG. 4 is a flow chart of arithmetic operations for determining a focal length of the photographing lens used with the camera of FIG. 1.

This will be explained below with reference to a flow chart of the operations shown in FIG. 4.

In step S1, the lens CPU 30 receives a discrimination code is inputted thereto for discriminating the kind of mounted lens from the lens judging code plate 39.

Thereafter, the zoom code data corresponding to the optional zoom ring position x is inputted from the zoom code 37 (distance code plate B) to the lens CPU 30, in step S2.

In step S3, the lens judging means 45 determines whether the photographing lens mounted to the camera body 1 is an old lens or a new lens, or a zoom lens, a single focus lens or a single focus macro lens, in accordance with the data of the lens judging code plate 39.

Thereafter, in step S4, the data of the focal length "$f_T$" in the telephoto extremity and the common ratio "r" thereof are sent to the RAM from the telephoto extremity focal length storing means 50 in accordance with the determination of the lens judging means 45. Although the focal length "$f_T$" at the telephoto extremity is used as data for calculation, it is possible to use the focal length in the wide angle extremity, or any reference focal length other than those in the telephoto extremity and the wide angle extremity.

In step S5, the arithmetic operating means 44 calculates the focal length which is geometrically (or arithmetically) divided correspondingly to the lens, in accordance with the data obtained in step S4, based on equation (4) mentioned above, and the calculation result obtained is stored in the RAM. The calculated data of the focal length is directly transmitted as new communication to the main CPU 10 and the indication CPU 11 without going through the lens interface 41.

Calculation of K VALUE at Zooming

The calculation of the K value (automatic focusing drive pulse coefficient) used in the zooming operation is performed by the arithmetic operating means 44.

In the following description, "K" designates the K value at a focal length F, "G" designates a gear ratio of the focusing mechanism 31 in the photographing lens 2, "P" designates a number of pulses when the coupler 19a on the camera body side rotates by one turn, "L" designates a lead (mm) of a focusing helicoid, i.e., the displacement when the helicoid rotates by one turn, "F" designates a FL conversion coefficient, i.e., the ratio between a displacement of the lens and a displacement of the image plane, and "$f_T$" designates a focal length at the telephoto extremity.

The K value "K" can be obtained by the following equation:

$$K = \frac{G \times P \times F}{L} \qquad (10)$$

Since the photographing lens 2 is a zoom lens, the focal length "F" is determined by the following formula:

$$F = \left(\frac{f_T}{f_x}\right)^2 \qquad (11)$$

wherein $f_x$ is the focal length at the position x of the zoom ring, and $f_T$ is focal length at the telephoto extremity.

From equations (10) and (11), the K value "$K_x$" at the zoom ring position x (the x-th focal length step from the telephoto extremity) is obtained by formula (12):

$$K_x = \frac{G \times P \times \left(\frac{f_T}{f_x}\right)^2}{L} \qquad (12)$$

K value "$K_T$" at the telephoto extremity is obtained by the following equation (13):

$$K_T = \frac{G \times P \times 1}{L} \qquad (13)$$

From equations (12) and (13) mentioned above, we have:

$$K_x = K_T \times \left(\frac{f_T}{f_x}\right)^2 \qquad (14)$$

From equations (14) and (4), "$K_x$" in a geometrical division and an arithmetic division can be obtained by the following equation, respectively:

$$K_x = K_T \times (r^x)^2 \qquad (15)$$

$$K_x = K_T \times \left(\frac{f_T}{f_T - d_x}\right)^2 \qquad (16)$$

When the K value is determined in accordance with equation (15) and (16), two methods are used: (a) the common ratio is directly used as data for calculation, and (b) the coefficient obtained based upon the common ratio is prestored in the ROM (data table 47) as data corresponding to each code step of the zoom ring position, so that the stored data is fetched from the data table 47 to calculate the K value.

Figure 5:
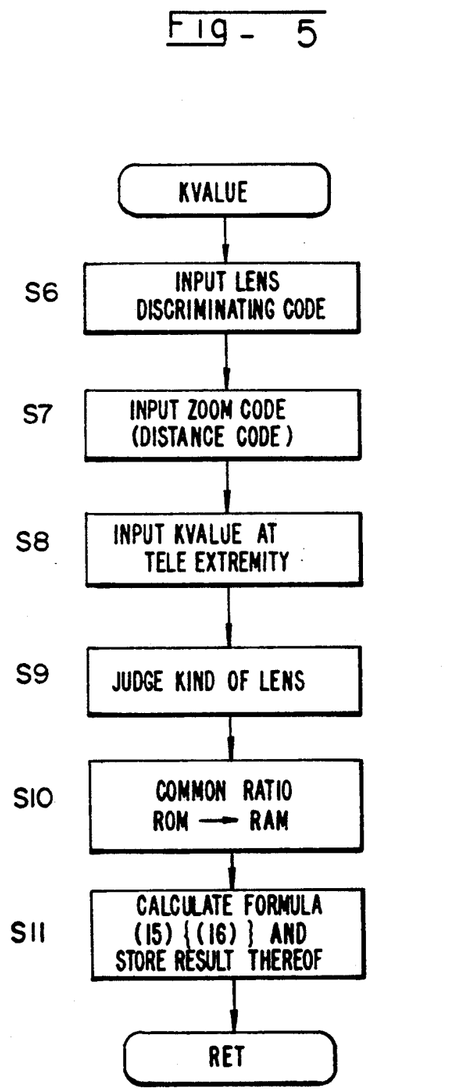
FIG. 5 is a flow chart for arithmetic operations for determining a K value, by way of example.

The first method (a) mentioned above will be first explained below, with reference to the flow chart of FIG. 5.

In step S6, the discrimination code is input from the lens judging code plate 39 to discriminate the kind of lens. Thereafter, the zoom code (or the distance code in the case of a single focus macro lens) in the zoom ring position x (the x-th focal length step from the telephoto extremity) is input from the zoom code plate 37 (i.e., the distance code plate B).

In step S8, the k value at the telephoto extremity (or infinite object distance in the case of a single focus macro lens) is inputted.

Thereafter, the lens judging means 45 determines the kind of photographing lens, in accordance with the lens discrimination code from the lens judging code plate 39 (step S9).

In step S10, the common ratio "r" (or "a" in the case of a single focus macro lens, which is discussed in detail below) corresponding to the photographing lens mounted to the camera body 1 is transferred to the RAM from the data storing means 46.

Thereafter, the arithmetic operating means 44 calculates the k value at the zoom ring position x, based on formulate (15) and (16) in step S11. The calculated data is stored in the RAM. Thereafter, control returns. This means that the calculation of the K value "$K_x$" is in accordance with the K value "$K_T$" which is steady data inputted from the CPU port (pin) in the telephoto extremity, the common ratio "r" which is ROM data in the lens CPU 30, and the steady data "x" of the zoom code plate.

The data "$K_x$" obtained is directly sent to the main CPU 10 and the indication CPU 11 as new communication without going through the lens interface 41. The CPU 10 controls the photographing lens 2 in accordance with the data "$K_x$" input thereto.

Figure 6:
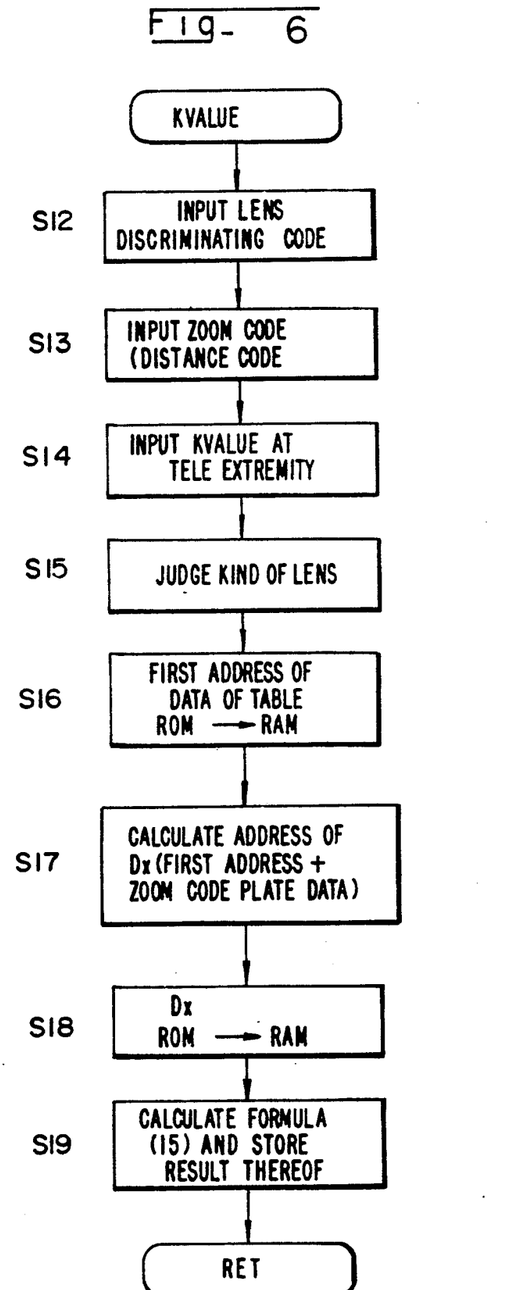
FIG. 6 is a flow chart for determining arithmetic operations of the K value according to another embodiment of the present invention; and, FIG. 7 is a diagram showing a relationship between the variation of the K value and the movable range of a distance ring.

On the other hand, in the case of method (b) mentioned above, the discrimination code is inputted from the lens judging code plate 39 to determine the kind of photographing lens 2, in step S12, shown in FIG. 6.

In step S13, the zoom code (or the distance code in the case of a single focus macro lens) in the zoom ring position is inputted from the zoom code plate 37.

In step S14, the k value in the telephoto extremity (or infinite object distance the case of a single focus macro lens) is input from the data setting portion 40.

Thereafter, the lens judging means 45 determines the kind of photographing lens in accordance with the lens discrimination code from the lens judging code plate 39 in step S15.

In steps S16 and S17, the data table (Table 5 or 6) to be used is selected, and the first address (or the first address + zoom code plate data in the case of a single focus macro lens) of the data "$D_x$" of the required value "$(r^x)^2$" is calculated. The value "$D_x$" is fetched from the selected data table and is stored in the RAM in step S18.

Thereafter, the arithmetic operating means 44 calculates the drive pulse coefficient K value, based on equation (10) in step S19. The calculated data is stored in the RAM. Thereafter, control returns. Namely, a predetermined number of parts "$(r^x)^2$" of the equation (150 corresponding to number of the divided focal lengthsteps of the zoom ring is only stored in the ROM as a table data so as to selectively use the data, depending on the kind of photographing lens mounted to the camera body.

The calculation method (b) mentioned above will be explained below in more detail, with reference to the calculation of the K value, based on a 4 bit signal inputted from the zoom code plate 37, by way of examples. In the examples below, the data tables are divided into 16 ($2^4 = 16$) segments Note that $r - 1.09375$ in Table 5 and $r = 1.125$ in Table 6. The four bit signals are inputted from the zoom code plate 37. In the embodiments, the K value is calculated from the four bit signals, meaning that a maximum of 16 ($2^4 - 16$) different data can be recorded. Thus, Tables 5 and 6 are divided into 16 parts. However, it is not necessary to always use all 16 data, since an exchanged-photographing lens requires a different amount of data, just up to the minimum amount necessary for the zooming ratio of the lens.

In the case of "a photographing lens having a zoom ratio of 3", the value "$(r^x)$" in equation (15) for Table 5 in which $r - 1.09375$ is as follows:

In Formula (15), $K_x = K_T x (r^x)^2$. Using the known value $K_T$, which corresponds to the x-th from "0" in Table 5, one can calculate the K value. The procedure is to find the value of "x" that is infinitely close to "3" (the zoom ratio of the lens). In other words, $(r^{x2} \approx 3^2$. As a result, $(r^{12})^2 \approx (2.95)^2 \approx (3)^2$. As shown in $(r^{12})$, the data from 0 to 12th in Table 5, which corresponds to 13 different data, are sufficient for a photographing lens having a zoom ratio of 3.

Consequently, the zoom code is divided into 13 segments.

In the case of "a photographing lens having a zoom ratio of 4", the value "$(r^x)$" in formula (150 for table 6 in which $r - 1.125$ is as follows.

In formula 15, $K_x = K_T x (r^x)^2$. Using the known value $K_T$, which corresponds to the x-th from "0" in Table 6, one can calculate the k value. The procedure is to find the value of "x" that is infinitely close to "4" (which is the zoom ratio of the lens). In other words, $(r^x)^2 \approx 4^2$. As a result, $(r^{12})^2 \approx (4.11)^2 \approx (4)^2$. As shown in $(r^{12})$, the data from 0 to 12th in Table 6, which corresponds to 13 different data, are sufficient for a photographing lens having a zooming ratio of 4.

Consequently, the zoom code is divided into 13 segments. Namely, when the value $K_x$ is calculated, based on the telephoto extremity K value and the value $D_x$ which are port data $k_T$ of the micro computer, based on equation (15), the following equation is satisfied.

$$K_x = K_T \times M_x \qquad (17)$$

wherein $M_x$ is ROM data at position x.

TABLE 5

| ADDRESS1 | r = 1.09375 |
| --- | --- |
| 0 | $1.09375^0$ |
| 1 | $1.09375^2$ |
| 2 | $1.09375^4$ |
| 3 | . |
| 4 | . |
| 5 | . |
| 6 | . |
| 7 | . |
| 8 | . |
| 9 | . |
| 10 | . |
| 11 | . |
| 12 | . |

TABLE 5-continued

| ADDRESS1 | r = 1.09375 |
|---|---|
| 13 | . |
| 14 | . |
| 15 | . |

TABLE 6

| ADDRESS2 | r = 1.125 |
|---|---|
| 0 | $1.125^0$ |
| 1 | $1.125^2$ |
| 2 | $1.125^4$ |
| 3 | . |
| 4 | . |
| 5 | . |
| 6 | . |
| 7 | . |
| 8 | . |
| 9 | . |
| 10 | . |
| 11 | . |
| 12 | . |
| 13 | . |
| 14 | . |
| 15 | . |

Calculation of K value in Single Focus Macro Lens

There are two methods of calculation of the K value by the arithmetic operating means 44, similar to the case of the zooming mentioned above. In the following example, the object distance code is geometrically divided into n-codes.

The common ratio "a" is given by the following formula:

$$a = {}^{2(n-1)}\!\!\sqrt{\frac{K_N}{K_\infty}} \qquad (18)$$

wherein "$K_N$" is a K value at a NEAR extremity of a macro lens, and "$K\infty$" is a K value at an infinite object distance.

The common ratio "a" is stored in the data storing means 46 of the lens CPU 30 and is outputted to the antithetic operating means 44 at an address designated upon calculation of the K value.

When the code of the distance code plate B is geometrically divided into n-codes, the K value "Ky" at an optional object distance "y" ($0 \leq y \leq n-1$) of the macro lens is obtained by the following formula:

$$Ky = K\infty \times (a^y)^2 \qquad (19)$$

The example below is directed to a 2.8/50 mm macro lens mounted to the camera body 1, in which the code of the distance code plate B is divided into 6 codes.

Figure 7:
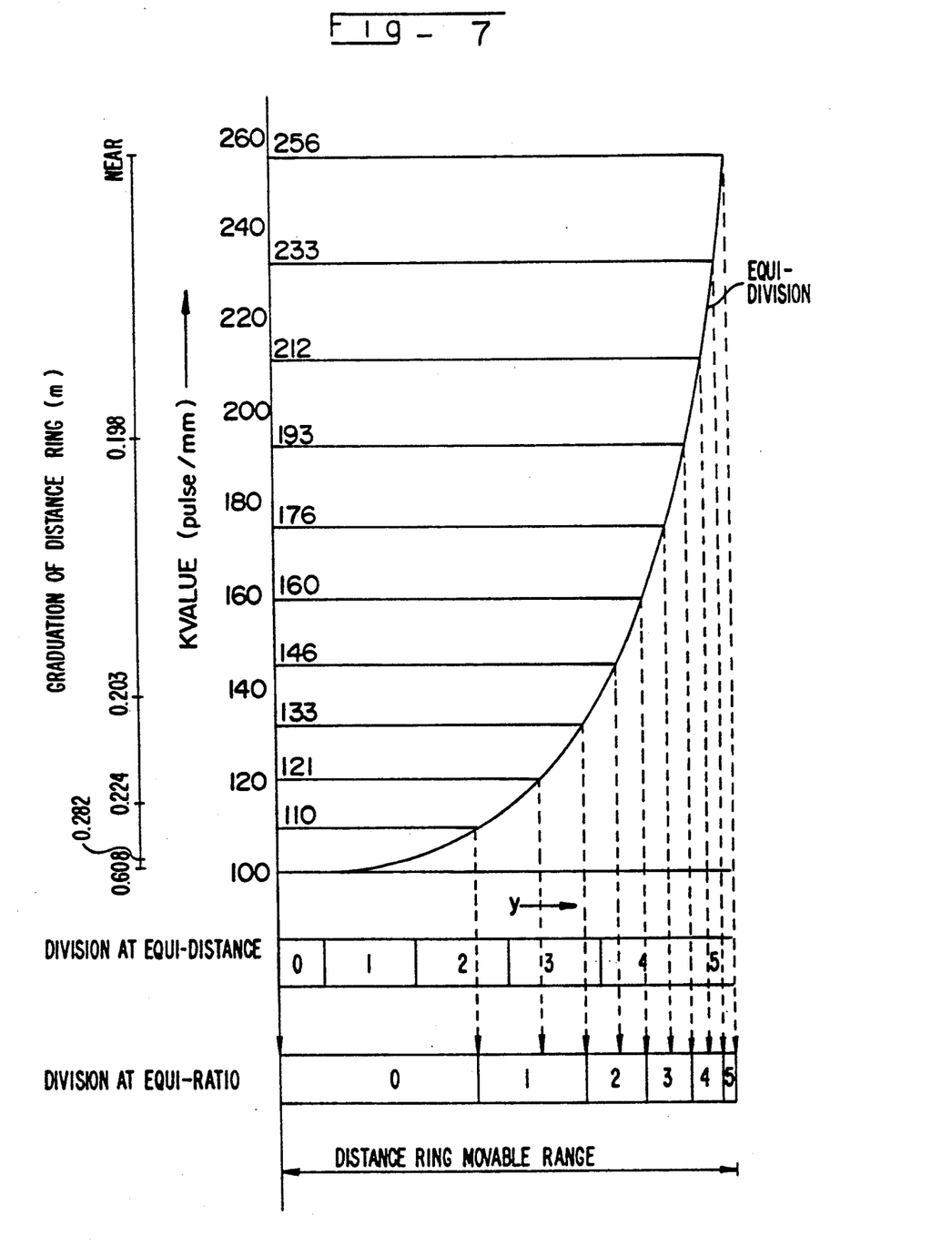

FIG. 7 shows a diagram in which an abscissa represents a code number of the distance code plate B which is equally divided into six (No. 0 through 5), and an ordinate, is divided into the K value, and the position "y" (object distance) of the distance ring corresponding thereto.

If Kn = 256, K∞ = 100, N = 6, we have from equation (18):

$$a = {}^{2(6-1)}\!\!\sqrt{\frac{256}{100}}$$

= 1.09856 (common ratio)

The common ratio (1.09856) which is stored in the data storing means 46 is outputted to the arithmetic operating means 44 at an address designated upon calculation of the K value by the arithmetic operating means 44.

When the common ratio of 1.09856 is inputted into the arithmetic operating means 44, the K value Ky at the object distance "y" can be obtained from equation (19);

$$Ky = 100 \times (1.09856^3)^2$$
$$\approx 176$$

Since the value "Ky" is an intermediate value of the distance code plate B in a geometrical division, the object distance "y" (from the distance code plate B and the K value (Ky−y+1) at the changing point (y+1) is obtained by the following equation:

$$(Ky-y+1) = K_\infty \times (a^{y+0.5})^2$$

Consequently, when the value of (Ky−y+1) for each Ky is calculated, the following Table 7 is obtained:

TABLE 7

| y | Ky | Ky−y+1 |
|---|---|---|
| 0 | 100 | |
| | | 110 |
| 1 | 121 | |
| | | 133 |
| 2 | 146 | |
| | | 160 |
| 3 | 176 | |
| | | 193 |
| 4 | 212 | |
| | | 233 |
| 5 | 256 | |

Although the invention has been described with reference to particular means, materials and embodiments, it is to be understood that the invention is not limited to the particulars disclosed and extends to all equivalents within the scope of the claims.

We claim:

1. A camera system for communicating data between a micro computer associated with a camera body and a zoom lens that is selectively mounted to said camera body, wherein at least focal length data is transmitted from said zoom lens to said micro computer, said zoom lens comprising:
   a position detecting means for detecting divided focal length steps corresponding to optional focal lengths of said zoom lens;
   a specific focal length outputting means for outputting at least one focal length of a focal length step detected by said position detecting means; and,
   an arithmetic operating means for calculating a focal length in each focal length step, in accordance with data representing a divided focal length step detected by said position detecting means and data representing a focal length from said specific focal length outputting means.

2. A camera system according to claim 1, wherein said micro computer associated with camera body comprises an indication CPU and a main CPU.

3. A camera system according to claim 1, wherein said zoom lens includes a lens CPU.

4. A camera system according to claim 3, wherein said position detecting means comprises a zoom code plate that is electrically connected to said lens CPU.

5. A camera system according to claim 1, wherein said specific focal length outputting means comprises means for storing said focal length data at a telephoto extremity and outputting said stored data in accordance with need.

6. A camera system according to claim 1, wherein said arithmetic operating means comprises means for storing a common ratio for geometrically dividing a focal length range of said zoom lens into a plurality of steps.

7. A camera system according to claim 6, wherein a focal length $f_x$ at an x-th focal length step from a telephoto extremity is obtained by the following equation:

$$f_x = f_T / r^x;$$

wherein r is a stored common ratio, and $f_T$ is a focal length at said telephoto extremity.

8. A camera system according to claim 1, wherein said arithmetic operating means comprises means for storing a common difference for arithmetically dividing a focal length range of said zoom lens into a plurality of steps.

9. A camera system according to claim 8, wherein a focal length $f_x$ at an x-th focal length step from a telephoto extremity is obtained by the following equation:

$$f_x = f_T - dx;$$

wherein d is a stored common difference, and $f_T$ is a focal length at said telephoto extremity.

10. A camera system for communicating data between a processor associated with a camera body and a lens that is selectively mounted to said camera body, said lens comprising:
- a memory that stores a telephoto extremity focal length of said lens and a common ratio of said lens in accordance with said detected lens type;
- a focal length calculator that calculates a focal length by geometrically dividing a focal length of said lens in accordance with said telephoto extremity focal length and common ratio stored in said memory; and
- a temporary memory that temporarily stores said calculated focal length.

11. The camera system of claim 10, further comprising a lens type detector that detects a type of lens mounted to said camera body.

12. The camera system of claim 10, wherein said calculated focal length at an x-th focal length step from a telephoto extremity is obtained by the following equation:

$$F_x = f_T / r^x;$$

wherein:
- $f_x$ represents said calculated focal length at an x-th focal length step from said telephoto extremity;
- $r_x$ represents said stored common ratio at said x-th focal length step; and
- $f_T$ represents said focal length at said telephoto extremity.

13. The camera system of claim 10, wherein a focal length $f_x$ at an x-th focal length step from a telephoto extremity is obtained by the following equation:

$$f_x = f_T - dx;$$

wherein:
- d represents a stored common difference; and
- $f_T$ represents a focal length at said telephoto extremity.

14. A camera system, comprising:
- a camera body having a processor;
- a zoom lens that is selectively mountable to said camera body,
- a lens type detector associated with said camera body that determines what type of lens is mounted to said camera body;
- a storage device that is associated with said lens that functions to essentially permanently store data representing a telephoto extremity focal length and a common ratio of said lens, in accordance with said detected lens type;
- a focal length calculator that calculates a focal length of said lens that is geometrically divided correspondingly to said detected lens type in accordance with said data stored in said first storage device;
- a temporary storage device that temporarily stores said calculated focal length; and
- means for transmitting the temporarily stored calculated focal length to said processor associated with said camera body.

15. The camera system of claim 14, wherein said storage device and said temporary storage device comprise a single memory.

16. The camera system of claim 14, wherein said storage device comprises a read only memory (ROM).

17. The camera system of claim 14, wherein said temporary storage device comprises a random access memory (RAM).

18. The camera system of claim 14, wherein said calculated focal length at an x-th focal length step from a telephoto extremity is obtained by the following equation:

$$F_x = f_T / r^x;$$

wherein:
- $f_x$ represents said calculated focal length at an x-th focal length step from said telephoto extremity;
- $r_x$ represents said stored common ratio at said x-th focal length step; and
- $f_T$ represents said focal length at said telephoto extremity.

19. The camera system of claim 14, wherein a focal length $f_x$ at an x-th focal length step from a telephoto extremity is obtained by the following equation:

$$F_x = f_T - /d_x;$$

wherein:
- d represents a stored common difference; and
- $f_{Tl}$ represents a focal length at said telephoto extremity.

* * * * *

UNITED STATES PATENT AND TRADEMARK OFFICE
CERTIFICATE OF CORRECTION

PATENT NO. : 5,182,591
DATED : January 26, 1993
INVENTOR(S) : M. KAWASAKI et al.

It is certified that error appears in the above-indentified patent and that said Letters Patent is hereby corrected as shown below:

At column 16, line 67 (claim 2, line 2) of the printed patent, insert ---the--- after "with".

At column 17, line 59 (claim 12, line 6) of the printed patent, change "$F_x = f_T / r^x$" to ---$f_x \, f_T / r^x$---.

At column 18, line 47 (claim 18, line 6) of the printed patent, change "$F_x = f_T / r^x$" to ---$f_x = f_T / r^x$---.

At column 18, line 60 (claim 19, line 5) of the printed patent, change "$F_x = f_T - 'd_x$" to ---$f_x = f_T - d_x$---.

At column 18, line 64 (claim 19, line 9) of the printed patent, change "$f_{T_L}$" to ---$f_T$---.

Signed and Sealed this

Fifth Day of November, 1996

Attest:

BRUCE LEHMAN

*Attesting Officer*   *Commissioner of Patents and Trademarks*